Sept. 15, 1942. E. J. CONRAD 2,295,890
DOLL
Filed Sept. 8, 1941

Inventor
Edna J. Conrad
By Liverance and Van Antwerp
Attorneys

Patented Sept. 15, 1942

2,295,890

UNITED STATES PATENT OFFICE 2,295,890

DOLL

Edna J. Conrad, Grand Rapids, Mich.

Application September 8, 1941, Serial No. 409,930

10 Claims. (Cl. 46—165)

This invention relates in general to dolls, manikins or the like, and has particular regard to a new and novel mounting for the eyes in the heads of such objects. The novel eye mounting of my invention is designed to give the illusion of eye movement and to make it appear that the eyes of the object are following the observer. While the iris of the eyes actually do not move, the manner of their mounting in the head gives the illusion of movement.

In objects of this nature in the past it has been customary to locate the eyes substantially flush with the outer surface of the face or head and in some instances, particularly with respect to dolls, constructions have been made whereby the eyes actually move. With my invention, however, the illusion of eye movement is created by providing eye openings in the head of the object with the inner surfaces thereof extending rearwardly for a short distance and then mounting the iris of the eye at the rear end of the opening. The eyes thus set inwardly a short distance from the outer surface of the head will create an illusion of movement when the head is turned or when the observer moves by reason of the fact that the inner surfaces of the openings simulate the whites or the sclerotic coat of the human eye. This obviates any necessity for and the incident expense of eye moving mechanisms. In humans, when the eyes are moved up or down or to one side a greater amount of the white is in evidence and a lesser amount of the iris than when looking straight ahead. This same effect is created by the novel mounting which is the subject matter of this invention by reason of the fact that when the head of the object is turned or when the observer moves in any direction from directly in front of the object a greater amount of the inner surfaces of the eye openings is in evidence.

While I have mentioned that the eye mounting of this invention is particularly adapted for use with dolls and manikins, it is to be understood that the same technique and construction could be used in other arts such as in taxidermy to give the illusion of eye movement in the heads of stuffed animals.

A more clear understanding of the invention may be had upon considering the following description taken in connection with the accompanying drawing wherein, Fig. 1 is a front elevation of a doll head equipped with my invention.

Figure 2:
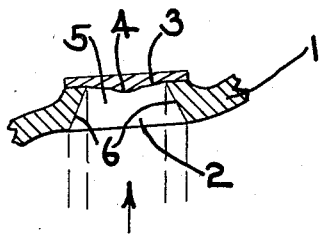
Fig. 2 is an enlarged fragmentary horizontal section through one of the eyes taken substantially on the plane of line 2—2 in Fig. 1.
Figure 4:
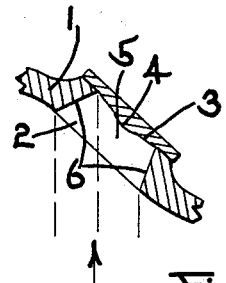
Fig. 4 is a fragmentary horizontal section through one of the eyes taken substantially on the plane of line 4—4 in Fig. 3.

The arrows in Figs. 2 and 4 indicate the line of vision of an observer.

While the different objects on which the invention may be used have been enumerated above, for purposes of illustration it has been found more convenient to use a doll head which is indicated in the drawing by the numeral 1. In the head the usual eye openings 2 are provided in their proper location. The inner surfaces surrounding the openings 2 extend rearwardly for a short distance into the head portion and have secured at their inner ends an iris 3 having the usual pupil thereon designated at 4.

Figure 5:
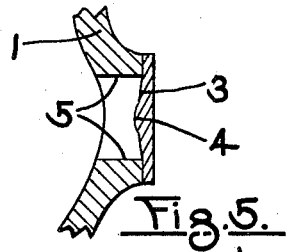
Fig. 5 is a fragmentary vertical section through one of the eyes taken substantially on the plane of line 5—5 in Fig. 1.

While the inner surfaces of the openings may assume various particular forms, the most effective has been found to be where the upper and lower inner surfaces 5 of the openings are parallel or substantially so as shown in Fig. 5, and I prefer to form the inner surfaces of each opening at the sides thereof, indicated at 6, so that they will converge rearwardly as shown in Figs. 2 and 4.

Figure 1:
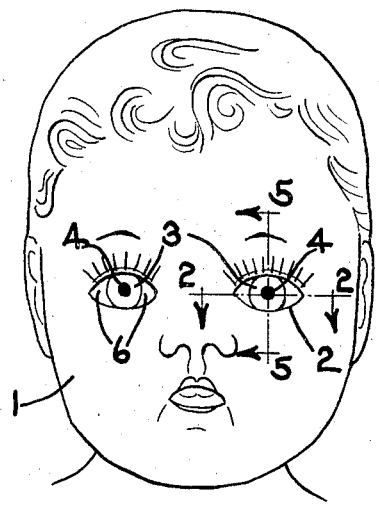
Figure 3:
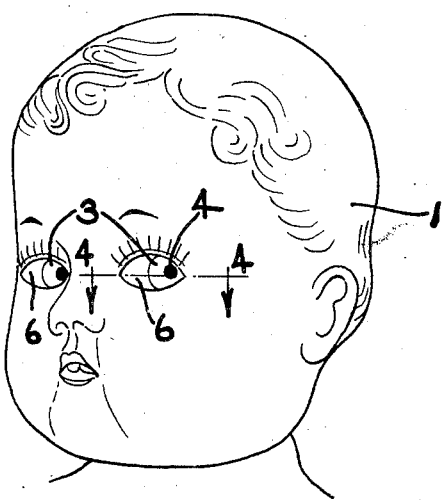
Fig. 3 is a partial front and side elevation similar to Fig. 1 wherein the doll head has been turned through substantially 45°.

The iris may be rigidly mounted at the rear end of the opening and, by reason of the converging sides of the inner surfaces thereof, when the object is viewed from the front the sides 6 will appear as in Fig. 1 where they will simulate the sclerotic coat or the whites of the eye at each side of the iris. If the observer moves toward the right or left or if the object's head is moved in this manner as shown in Fig. 3, only a part of the iris will appear and a greater amount of one side of the opening will be in evidence so that the effect will be as shown in Fig. 3 where the object appears to be looking to one side. It will be obvious that the same illusion will be created whether the head is moved sideways or up and down. When moved upwardly or downwardly, more of the upper and lower inner surfaces 5 of the openings will be in evidence and will therefore again simulate the movement of the human eye.

Figure 6:
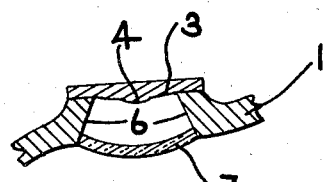
Fig. 6 is a horizontal section similar to Fig. 2 showing a modified form.

It may be desirable in some instances to cover the outer end of each opening with a piece of glass or other transparent material 7 (Fig. 6) to thereby impart an even greater likeness to the human eye because of reflections which might be produced by light shining against or through this transparent eye covering. When this covering is used, the eye mounting may be the same as described above.

It will be obvious that the external features of the head may be altered and may even be provided with mechanical eyelids and the like without departing in any way from the spirit of the present invention.

From the foregoing description it will be evident that a novel construction of eye mounting for doll heads and the like has been created to give the illusion of eye movement in the object, when as a matter of fact, the eye itself is actually immovable.

Other modes of applying the principle of my invention may be used instead of the one here described, change being made as regards the structure herein disclosed provided, however, that the means stated by any of the following claims or the equivalent of such stated means be employed.

I, therefore, particularly point out and distinctly claim as my invention:

1. In a device of the class described, a head portion, eye openings in said head, the upper and lower edge portions of each opening extending rearwardly and being substantially parallel and the sides thereof converging rearwardly, and an iris rigidly secured to the head behind each opening, whereby said edge portions and sides of the openings simulate the sclerotic coat of the human eye, and the iris appears to move and follow the observer.

2. The combination of elements defined in claim 1, combined with a transparent covering at the front of each opening.

3. In a device of the class described, a head portion, eye openings in said head, the edge portions of each opening extending rearwardly for a short distance, and an iris located at the rear of each opening, the size of each opening at its rear end being substantially the same as the size of the iris, whereby the edge portions of each opening simulate the sclerotic coat of the human eye, and the iris appears to move and follow the observer.

4. The combination of elements defined in claim 3, wherein the portions of each opening at the sides thereof converge rearwardly.

5. The combination of elements defined in claim 3, wherein the upper and lower edge portions of each opening extend rearwardly in substantial parallelism and the sides thereof converge rearwardly.

6. The combination of elements defined in claim 3, combined with a transparent covering at the front of each opening.

7. In a device of the class described, a head portion, eye openings in said head, the edge portions of each opening extending rearwardly for a short distance, and an iris located at the inner end of each opening, whereby said edge portions of each opening simulate the sclerotic coat of the human eye and the iris appears to move and follow the observer.

8. The combination of elements defined in claim 7, wherein the sides of each opening converge rearwardly.

9. The combination of elements defined in claim 7, combined with an element of transparent material located at the outer end of each opening.

10. In a device of the class described, a head portion, eye openings in said head, and an iris located a distance inwardly from the outer end of each opening, whereby an illusion of eye movement following the observer is created.

EDNA J. CONRAD.